(12) United States Patent
Hattiangadi et al.

(10) Patent No.: US 11,060,425 B2
(45) Date of Patent: Jul. 13, 2021

(54) VALVE SEAT INSERT FOR ENGINE HEAD HAVING VENTURI FLOW CROWNS AND SEATING SURFACE PROFILED FOR LIMITING VALVE RECESSION

(71) Applicant: Caterpillar Inc., Deerfield, IL (US)

(72) Inventors: Ashwin A. Hattiangadi, Edwards, IL (US); Srikanth Reddy Boddapati, Krishna District (IN); Dongyao Wang, Rochester Hills, MI (US); Uijal Paladhi, Murshidabad (IN); Paul David Smallidge, West Lafayette, IN (US); John Robert Brubaker, Battle Ground, IN (US); Abe Ingold, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 153 days.

(21) Appl. No.: 16/352,347

(22) Filed: Mar. 13, 2019

(65) Prior Publication Data

US 2020/0291827 A1    Sep. 17, 2020

(51) Int. Cl.
*F01L 3/22* (2006.01)
*F02F 1/42* (2006.01)

(52) U.S. Cl.
CPC .............. *F01L 3/22* (2013.01); *F02F 1/4292* (2013.01)

(58) Field of Classification Search
CPC .............. F01L 3/22; F01L 3/06; F02F 1/4292
See application file for complete search history.

(56) References Cited

U.S. PATENT DOCUMENTS 2,517,114 A * 8/1950 Karcher .................... F01L 3/22
                                                         123/188.8
3,046,965 A    7/1962 Kauffmann et al.
(Continued)

FOREIGN PATENT DOCUMENTS

CN    201133264 Y    10/2008
CN    201277069 Y    7/2009
(Continued)

OTHER PUBLICATIONS

Ashwin Hattiangadi, Specification and Drawings for U.S. Appl. No. 16/188,577 Valve Seat Insert for Engine Having Double-Crowned Seating Surface Profiled for Limiting Valve Recession filed Nov. 13, 2018.

(Continued)

*Primary Examiner* — Joseph J Dallo
*Assistant Examiner* — Kurt Philip Liethen
(74) *Attorney, Agent, or Firm* — Brannon Sowers & Cracraft

(57) ABSTRACT

A valve seat insert for a gas exchange valve such as an intake valve controlling gas exchange of a cylinder includes an insert body having an inner peripheral surface, an outer peripheral surface, and a valve seating surface structured to contact the gas exchange valve at a closed position and profiled to limit valve recession thereof. The valve seating surface includes an arrangement of linear segments and curved segments forming wear crowns to contact the gas exchange valve at different wear states. The valve seat insert is further structured by way of the inner peripheral surface with an incoming flow crown, and a venturi extending from the incoming flow crown toward a throat of the valve seat insert. The venturi accelerates incoming gas flow.

19 Claims, 5 Drawing Sheets

(56) References Cited

U.S. PATENT DOCUMENTS

| | | | |
|---|---|---|---|
| 3,285,235 A * | 11/1966 | Ueberschaer | F01L 3/22 123/188.8 |
| 3,444,852 A * | 5/1969 | Henry-Biabaud | F02M 1/00 123/188.14 |
| 3,802,404 A | 4/1974 | Grosseau | |
| 3,963,016 A * | 6/1976 | Bouquet | F01L 3/22 123/188.8 |
| 4,147,149 A * | 4/1979 | Andrea | F01L 3/22 123/188.8 |
| 4,217,875 A * | 8/1980 | Elsbett | F01L 3/22 123/188.14 |
| 5,745,993 A | 5/1998 | Adachi et al. | |
| 5,765,520 A | 6/1998 | Adachi et al. | |
| 6,240,891 B1 * | 6/2001 | Lundqvist | F01L 3/06 123/188.8 |
| 6,260,531 B1 | 7/2001 | Haan et al. | |
| 6,536,397 B2 | 3/2003 | Mizutani | |
| 9,228,458 B2 | 1/2016 | Reinhart et al. | |
| 2004/0084005 A1 * | 5/2004 | Goto | F02F 1/4214 123/188.8 |
| 2010/0192892 A1 | 8/2010 | Huff | |
| 2012/0266840 A1 * | 10/2012 | Sakurai | F01L 3/22 123/193.2 |
| 2013/0061827 A1 * | 3/2013 | Moonen | F02F 1/24 123/193.5 |
| 2014/0190441 A1 | 7/2014 | Chern et al. | |
| 2015/0345420 A1 * | 12/2015 | Han | F02B 31/082 123/308 |
| 2016/0076480 A1 * | 3/2016 | Endrigo | F01L 3/22 123/193.5 |
| 2017/0058823 A1 | 3/2017 | Hayman et al. | |

FOREIGN PATENT DOCUMENTS

| | | |
|---|---|---|
| CN | 201301737 Y | 9/2009 |
| CN | 203783672 U | 8/2014 |
| CN | 103161542 B | 4/2015 |
| CN | 105422206 A | 3/2016 |
| EP | 0024890 | 3/1984 |
| FR | 1525285 | 5/1968 |
| FR | 3055030 | 2/2018 |
| JP | 8270417 A | 10/1996 |
| JP | 3715437 B2 | 11/2005 |
| JP | 2009057830 A | 3/2009 |
| JP | 2013119837 A | 6/2013 |
| JP | 2014214670 | 11/2014 |
| KR | 2013083608 A | 7/2013 |

OTHER PUBLICATIONS

Rong Qu, Specification and Drawings for U.S. Appl. No. 16/188,547 Valve Seat Insert for Internal Combustion Engine Profiled to Resist Valve Recession filed Nov. 13, 2018.

* cited by examiner

VALVE SEAT INSERT FOR ENGINE HEAD HAVING VENTURI FLOW CROWNS AND SEATING SURFACE PROFILED FOR LIMITING VALVE RECESSION

TECHNICAL FIELD

The present disclosure relates generally to engine valves and associated hardware, and more particularly to a valve seat insert for an intake valve that is crowned for enhanced gas flow and profiled to limit valve recession.

BACKGROUND

Gas exchange valves are used in internal combustion engines to control fluid connections between the cylinder and a supply of intake air or intake air and other gases such as recirculated exhaust gas, or between the cylinder and an exhaust manifold for expelling combustion products during operation. Designs are known wherein a single intake valve and a single exhaust valve are associated with each cylinder in an engine, as well as designs where multiple gas exchange valves of each respective type are associated with each cylinder. A camshaft, typically rotated at half engine speed, is coupled with valve lifters, bridges, rocker arms, and/or other equipment for controlling the opening and closing of gas exchange valves at appropriate engine timings.

Gas exchange valves are moved out of contact with and into contact with the engine head or a valve seat insert within the engine head to effect their opening and closing actions. Gas exchange valves may be moved between their open and closed positions with significant mechanical forces. The in-cylinder environment is associated with combustion temperatures of several hundred degrees along with relatively high pressures. These and other factors contribute to gas exchange valve operating conditions being quite harsh. It has been observed that gas exchange valves and valve seats or valve seat inserts can exhibit a phenomenon over time known as valve recession. Over the course of an engine's service life, or between service intervals, the contacts between a gas exchange valve and its valve seat can number in the millions or potentially even billions. The harsh conditions and great number of impacts can cause material of which the gas exchange valve and/or the valve seat is formed to wear away and/or become deformed, so that the valve "recedes" toward or into the engine head further than what is desired. Where valve seat recession becomes severe enough engine operation or performance can be compromised, sometimes requiring a so-called top end overhaul prematurely. Engineers have experimented with a variety of different techniques attempting to ameliorate the extent and effects of valve seat recession and other valve wear patterns. A continuing challenge to attempts at valve or valve seat redesign are the often-unpredictable effects that altered geometry has on gas flow or other operating characteristics. Gas flow patterns and/or efficiency can affect in-cylinder pressure and temperature, composition of a fuel and air mixture, or other parameters potentially impacting emissions reduction strategies, engine efficiency, heat dissipation or thermal fatigue, or still other parameters. One strategy apparently aimed at preventing the outer diameter side of a valve face from locally wearing is set forth in Japanese Patent Application Publication No. JP8270417A. According to the '417 reference, a convex surface bulging toward a seat surface of a valve face abuts against the seat surface of a valve seat to address local wear problems.

SUMMARY OF THE INVENTION

In one aspect, an engine head assembly for an internal combustion engine includes an engine head having an intake conduit formed therein, and a valve seat insert positioned at least partially within the engine head and defining a valve seat center axis extending between a first axial end surface structured to face a cylinder in the internal combustion engine, and a second axial end surface. The valve seat insert further includes an inner peripheral surface forming a throat, an outer peripheral surface, and a valve seating surface. The valve seating surface includes, in profile, an outer curved segment forming a first wear crown for contacting the intake valve at an early wear state, an inner curved segment forming a second wear crown for contacting the intake valve at a later wear state, and a linear segment extending between the outer curved segment and the inner curved segment. The inner peripheral surface includes, in profile, an upper curved segment forming an incoming flow crown, and a sloping segment extending between the upper curved segment and the inner curved segment. The upper curved segment transitions with the second axial end surface, and the incoming flow crown is set off radially inward from the engine head. The sloping segment is oriented at a venturi angle relative to the valve seat center axis, such that the inner peripheral surface forms a venturi to accelerate an incoming flow of gases to the cylinder.

In another aspect, a valve seat insert for an intake valve in an internal combustion engine includes an annular insert body defining a valve seat center axis extending between a first axial end surface structured for facing the cylinder in the internal combustion engine, and a second axial end surface. The annular insert body further includes an inner peripheral surface defining a throat structured to fluidly connect the cylinder to an intake conduit in an engine head, an outer peripheral surface, and a valve seating surface for contacting an intake valve extending between the first axial end surface and the inner peripheral surface. The valve seating surface includes, in profile, an outer curved segment forming a first wear crown for contacting the intake valve at an early wear state, an inner curved segment forming a second wear crown for contacting the intake valve at a later wear state, and a linear segment extending between the outer curved segment and the inner curved segment. The inner peripheral surface includes, in profile, an upper curved segment forming an incoming flow crown, and a sloping segment extending between the upper curved segment and the inner curved segment. The upper curved segment transitions with the second axial end surface, and the sloping segment extends radially inward from the upper curved segment at a venturi angle of about 10° or greater relative to the valve seat center axis, such that the inner peripheral surface forms a venturi to accelerate an incoming flow of gases to the cylinder.

In still another aspect, a valve seat insert for an intake valve in an internal combustion engine includes an annular insert body defining a valve seat center axis extending between a first axial end surface structured for facing the cylinder in the internal combustion engine, and a second axial end surface. The annular insert body further includes an inner peripheral surface defining a throat structured to fluidly connect the cylinder to an intake conduit in an engine head, an outer peripheral surface, and a valve seating surface for contacting an intake valve extending between the first axial end surface and the inner peripheral surface. The valve seating surface forms a first wear crown for contacting the intake valve at an early wear state, a second wear crown that is radially inward and axially inward of the first wear crown, for contacting the intake valve at a later wear state, and a middle surface that is linear in profile and extends between the first wear crown and the second wear crown. The inner peripheral surface forms an incoming flow crown transitioning with the first axial end surface, and a venturi extending between the incoming flow crown and the inner wear crown and defining a venturi angle of about 10° or greater relative to the valve seat center axis.

DETAILED DESCRIPTION

Figure 1:
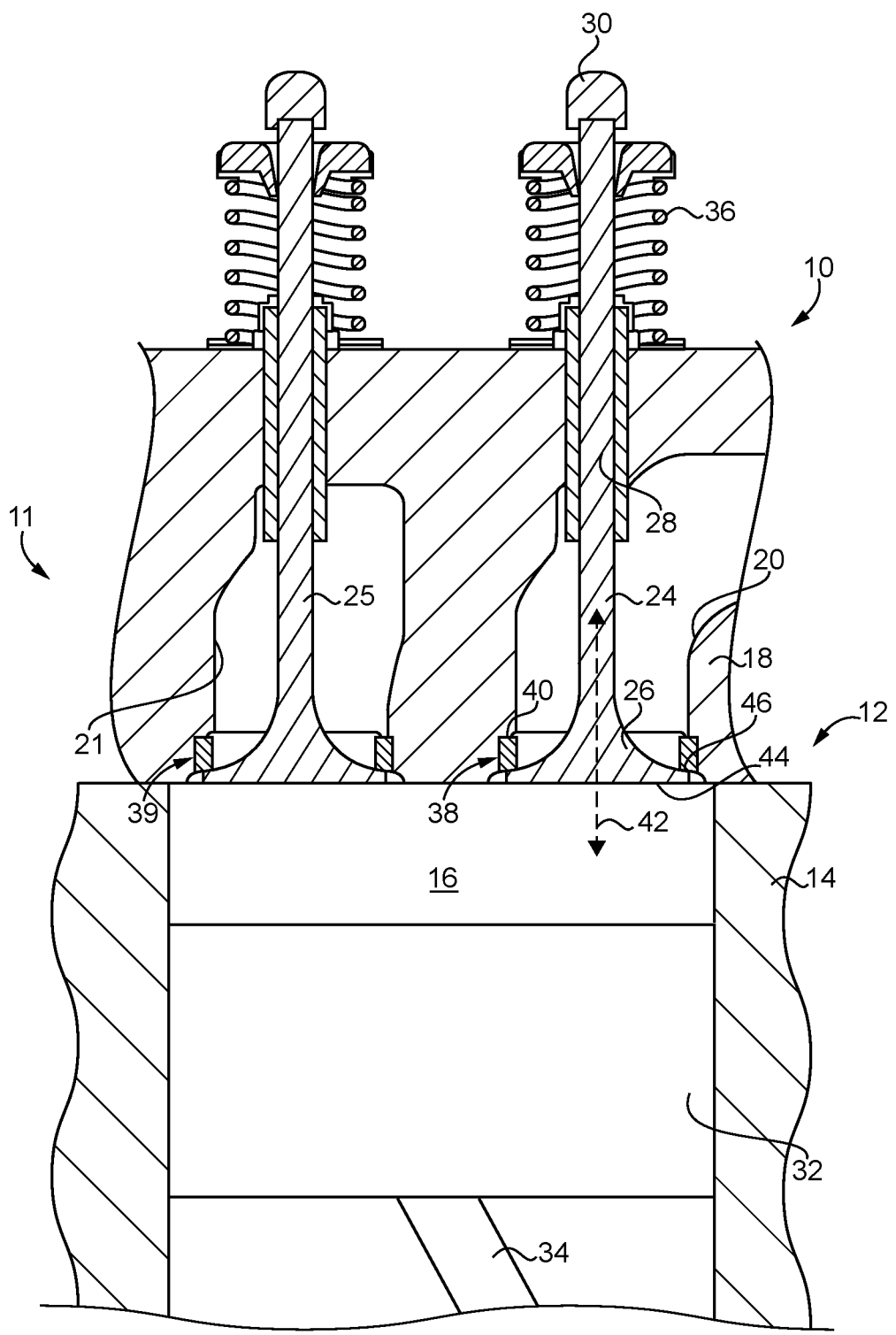
FIG. 1 is a sectioned side diagrammatic view of an internal combustion engine, according to one embodiment.

Referring to FIG. 1, there is shown an internal combustion engine according to one embodiment and including an engine housing 12 having a cylinder block 14 with a cylinder 16 formed therein. Internal combustion engine 10 (hereinafter "engine 10") could be any of a variety of engines including a compression ignition diesel engine, a spark-ignited gasoline engine, a gaseous fuel engine structured to operate on a fuel that is gaseous at standard temperature and pressure, a dual fuel engine, or still another. In a compression ignition diesel engine application, such as a direct-injected diesel engine, suitable fuels could include diesel distillate fuel, biodiesel, blends of these, or still others. An engine head 18 is coupled to cylinder block 14 and has a first gas exchange conduit 20 and a second gas exchange conduit 21 formed therein. Gas exchange conduits 20 and 21 could each or either be an intake conduit structured to fluidly connect with an intake manifold or an exhaust conduit structured to connect with an exhaust manifold. In a practical implementation strategy, gas exchange conduit 20 is an intake conduit and gas exchange conduit 21 is an exhaust conduit.

A piston 32 is movable within cylinder 16 between a bottom dead center position and a top dead center position and is coupled to a crankshaft (not shown) by way of a connecting rod 34 in a generally conventional manner. Engine 10 could include any number of cylinders arranged in any suitable configuration such as a V-configuration, an in-line configuration, or still another. Engine head 18 could include a monolithic engine head associated with all of a plurality of the cylinders in engine 10, or could be one of a plurality of separate engine head sections each associated with less than all of the cylinders in engine 10. Engine 10 further includes a first gas exchange valve 24, which can include an intake valve, and a second gas exchange valve 25, which can include an exhaust valve. Gas exchange valve 24, including aspects of its structure and operation, is discussed herein in the singular, however, it will be understood that the description of gas exchange valve 24 can apply by way of analogy to any other gas exchange valves within engine 10, except where otherwise indicated. Gas exchange valve 24 is shown more or less vertically oriented with respect to a direction of reciprocation of piston 32, however, it should also be appreciated that other configurations such as gas exchange valves at diagonal orientations are contemplated herein. Gas exchange valve 24 also includes a shaft or stem 28 connected to a valve head 26. A valve bridge 30 or the like may be coupled to gas exchange valve 24 such that gas exchange valve 24 can move together with another gas exchange valve (not shown) between open and closed positions, such as in response to rotation of a camshaft and movement of a rocker arm, a valve lifter assembly, and/or other equipment. A return spring 36 is coupled with gas exchange valve 24 in a generally conventional manner.

Engine 10 further includes an engine head assembly 11 formed by engine head 18 and a plurality of valve seat inserts 38 and 39 associated with gas exchange valves 24 and 25, respectively. Gas exchange valve 24, and by analogy other gas exchange valves of engine 10, are movable between a closed valve position and an open valve position. At the closed valve position an inner valve face 46 contacts valve seat insert 38, whereas gas exchange valve 25 contacts valve seat insert 39. At the closed position cylinder 16 is blocked from fluid communication with the corresponding gas exchange conduit 20 and 21. At the open valve position fluid communication exists. An outer valve face 44 or combustion face is oriented toward cylinder 16. As will also be further apparent from the following description, valve seat insert 38, and potentially also valve seat insert 39 is structured, together with the corresponding gas exchange valves 24 and 25, to slow and alter the nature of valve recession over the course of a service life or service interval of engine 10 and to provide intake gas flow properties at least as efficacious as, and potentially improved over, known designs.

Figure 2:
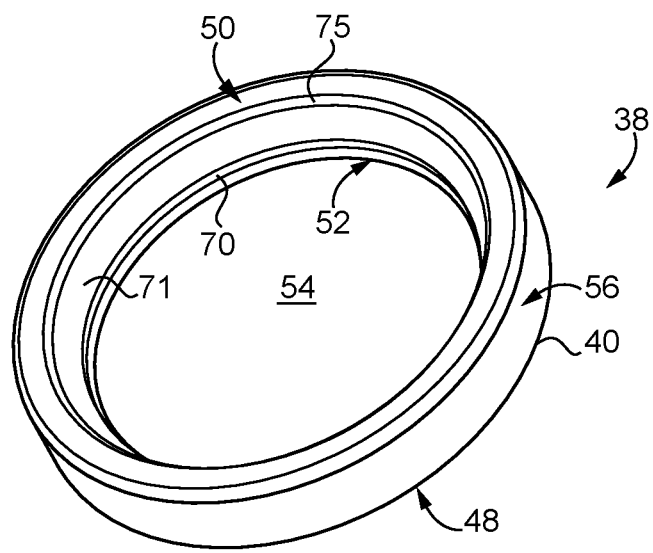
FIG. 2 is a pictorial view of a valve seat insert, according to one embodiment.
Figure 3:
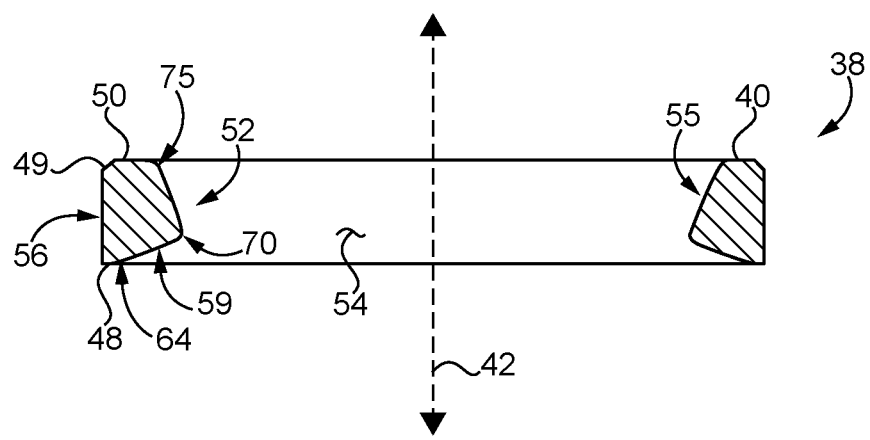
FIG. 3 is a sectioned view through the valve seat insert of FIG. 2.

Referring also now to FIGS. 2 and 3, there is shown valve seat insert 38 in greater detail. It will also be appreciated that descriptions of certain of the features of valve seat insert 38 will be understood to refer to analogous features of other valve seat inserts discussed and contemplated herein, except where otherwise indicated or apparent from the context. Valve seat insert 38 includes an annular one-piece insert body 40 that is positioned at least partially within engine head 18, such as by way of interference-fitting, and defines a valve seat center axis 42. Insert body 40 may be cast and machined and formed of a steel such as a high-alloy hardened steel or tool steel. Valve seat insert 38 further includes a first axial end surface 48 facing cylinder 16, a second axial end surface 50, an inner peripheral surface 52 defining a throat 54 to be positioned fluidly between cylinder 16 and gas exchange conduit 20 to fluidly connect the same, an outer peripheral surface 56, and a valve seating surface 59 extending between first axial end surface 48 and inner peripheral surface 52. Valve seat center axis 42 extends between first axial end surface 48 and second axial end surface 50. Inner peripheral surface 52 is generally conical, or can have a conical portion, and can further be seen to form a taper opening in a direction of second axial end surface 50. Inner peripheral surface 52, and/or its constituent surfaces, forms a venturi 55, narrowing toward throat 54, to accelerate an incoming flow of gases to cylinder 16 when gas exchange valve 24 is open, compensating for certain valve seat differences or even improving over earlier designs, having other or no special modifications to eliminate, or retard the progression of, valve seat recession. As further discussed herein, valve seat insert 38 may have a proportionally larger valve seating surface area than certain prior designs, and somewhat less available flow area for gas exchange, with the improved venturi-accelerated flow compensating for, or more than compensating for, what might otherwise be expected to be reduced performance. Outer peripheral surface 56 has a cylindrical shape and may be located at a uniform distance from valve seat center axis 42. In an implementation, valve seat insert 38 is "dry," meaning that no additional cooling by way of engine coolant or the like is employed. Outer peripheral surface 56 may be uninterrupted in abutment against engine head 18, such that when valve seat insert 38 is positioned within engine head 18 for service, such as by way of an interference fit, there is no backside cooling void, or other cavity formed that provides liquid cooling to valve seat insert 38. A chamfer 49 may extend between outer peripheral surface 56 and second axial end surface 50.

Figure 4:
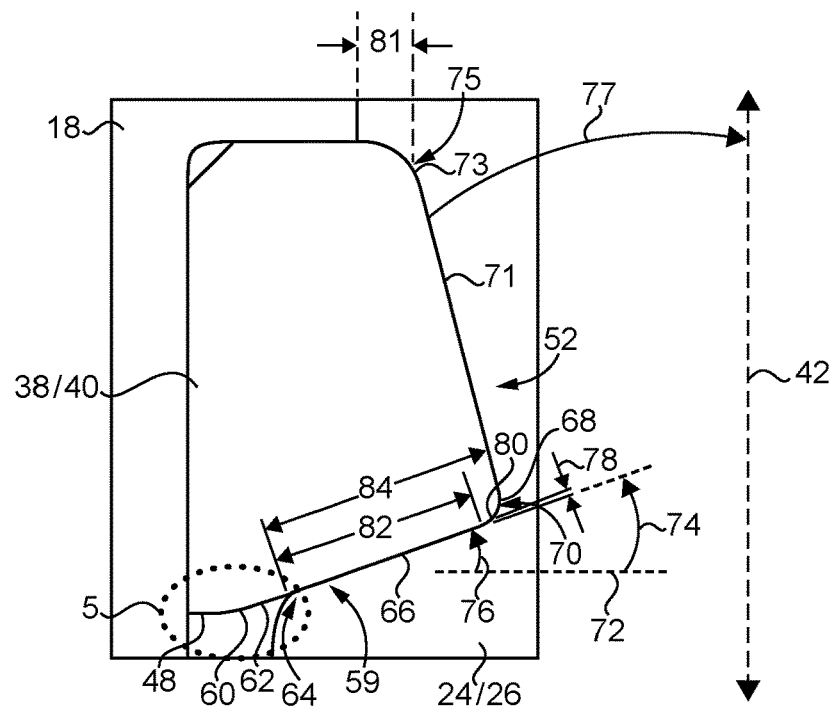
FIG. 4 is a sectioned side diagrammatic view of portions of a gas exchange valve and valve seat insert, according to one embodiment.

Referring also now to FIG. 4, it will be recalled that valve seat insert 38 is structured to slow and influence the progression of certain wear modes resulting from contact between a valve and valve seat over time. Valve seat insert 38 includes valve seating surface 59 extending between first axial end surface 48 and inner peripheral surface 52 as discussed above. Valve seating surface 59 may be profiled to limit valve recession and includes, in profile, an outer linear segment 60 adjacent to first axial end surface 48, an outer curved segment 62 adjacent to and transitioning with outer linear segment 60, an inner linear segment 66 adjacent to an transitioning with outer curved segment 62, and an inner curved segment 68 adjacent to and transitioning with inner linear segment 66. Inner linear segment 66 may be understood to be formed by a middle surface, linear in profile, that extends between and transitions with outer curved segment 62 and inner curved segment 68. Transitions with, transitioning, and related terms, can be understood to mean that an endpoint of one line segment is also the endpoint of an adjacent line segment. Outer curved segment 62 forms a first wear crown 64 for contacting gas exchange valve 24 at an early wear state, and inner curved segment 68 forms a second wear crown 70 radially inward and axially inward of first wear crown 64 for contacting gas exchange valve 24 at a later wear state, with inner linear segment 66 extending between outer curved segment 62 and inner curved segment 68. The term "axially inward" as used herein should be understood to mean a direction that is along valve seat center axis 42 toward a midpoint of a line segment of axis 42 that corresponds to a full axial length dimension of valve seat insert 38. "Axially outward" means an opposite direction, away from that midpoint. "Radially inward" and "radially outward" are terms used generally conventionally.

Initial contact when valve seat insert 38 and gas exchange valve 24 are first placed in service may occur at a contact band between inner valve face 46 and first wear crown 64. As the respective components deform and wear they may transition from an early wear state where the components have a line contact, or nearly line contact, band formed between inner valve face 46 and first wear crown 64, to full face contact where inner valve face 46 is substantially parallel to and fully in contact with part of outer curved segment 62 and inner linear segment 66, and a still later wear state where full face contact is maintained but transitions also to contact with second wear crown 70. It should be appreciated that the term "early wear state" and the term "later wear state" are used herein in relation to one another, not necessarily meaning that "early" contemplates new nor that "later" contemplates old, although such terms could apply in an actual case. Certain basic principles illustrated relative to profiling of valve seating surface 59 have application to a number of different embodiments, some having additional or alternative structural details, as further discussed herein.

Inner peripheral surface 52 also includes, in profile, a sloping segment 71 that is linear and extends between inner curved segment 62 forming second wear crown 70 and an upper curved segment 73 forming an incoming flow crown 75. Upper curved segment 73 and thus incoming flow crown 75 may be formed by a radius having a size from about 1 millimeter to about 3 millimeters, and which may be about 1 millimeter in a refinement, and still more particularly about 1.2 millimeters. As used herein, the term "radius," refers to a physical surface structure, whereas radius "size" means the dimension of a geometric radius of a circle defined by that physical surface structure. Radiuses in this context could include a single radius or multiple, varying, radiuses. Sloping segment 71 may extend circumferentially around valve seat center axis 42 and is oriented at a venturi angle 77 relative to axis 42 that may be circumferentially uniform about valve seat center axis 42, equal to about 10° or greater, and more particularly may be about 14°. Sloping segment 71 may further transition with each of upper curved segment 73 and inner curved segment 68, with throat 54 being defined by inner curved segment 80. Incoming flow crown 75, and upper curved segment 73, transitions with second axial end surface 50 and is set off radially inward from engine head 18 a set off distance 81 that may be greater than the size of the radius forming upper curved segment 73. A size of the radius forming the inner curved segment 68 and thus second wear crown 70 may be from about 0.4 millimeters to about 3 millimeters, and more particularly may be about 0.4 millimeters.

In the illustration of FIG. 4 it can also be seen that inner valve face 46 is oriented at a valve angle 74 relative to a plane 72 that is oriented normal to valve seat center axis 42. Inner linear segment 66 is oriented at a seat angle 76 relative to plane 72 that is larger than valve angle 74. An interference angle 78 is formed by inner valve face 46 and inner linear segment 66, and a clearance 80 is formed between inner valve face 46 and inner linear segment 66. Valve angle 74 may differ from seat angle 76 by about 0.4° to about 0.6°. Seat angle 76 may be from about 20° to about 30°, and seat angle 76 may be about 20° in one practical implementation. Interference angle 78 may be about 0.37°. As used herein, the term "about" should be understood in the context of conventional rounding to a consistent number of significant digits. Accordingly, "about 20" means from 19.5 to 20.4, "about 19.5" means from 19.45 to 19.54, and so on.

Figure 5:
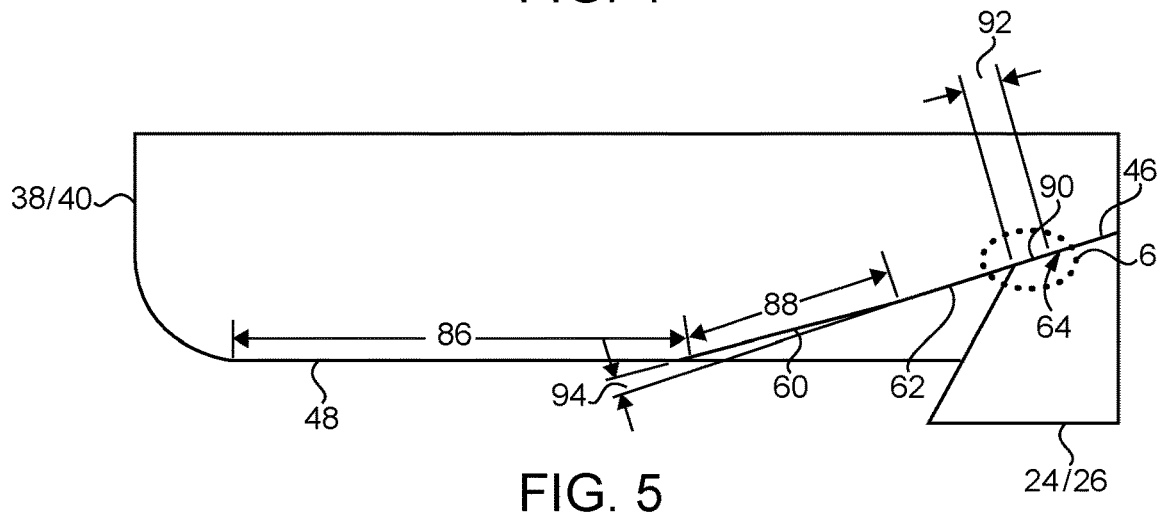
FIG. 5 is a detail view taken from circle 5 of FIG. 4.
Figure 6:
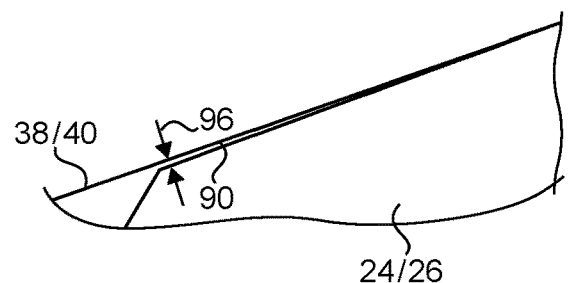
FIG. 6 is a detail view taken from circle 6 of FIG. 5.

Referring also now to FIG. 5 and FIG. 6, a second clearance 90 may be formed between inner valve face 46 and outer curved segment 62 and extends radially outward and axially outward from a contact band formed at the early wear state approximately as depicted, between inner valve face 46 and first wear crown 64. It will be recalled that the initial contact band may have an annular form and may be substantially a line contact pattern but expected to commence changing toward a face contact pattern as early break-in occurs. A size of the second clearance 90 may include a facing length 92 that is about 0.1 millimeters, between inner valve face 46 and outer curved segment 62 of valve seating surface 59. Facing length 92 can be understood as the distance from the contact band to an outer edge of valve head 26. Another angle 94 may be formed between outer linear segment 60 and inner linear segment 66 and may be about 5°. An edge clearance distance is shown at 96 and indicates a gap distance to outer curved segment 62 at an outer edge of inner valve face 46, and may be about 0.00056 millimeters.

Also shown in FIG. 4 is a full seating width dimension 84 or theoretical full seating width of valve seat insert 38 that may eventually become available as wear between the components progresses, in comparison to a break-in face contact width obtained when full face contact initially occurs. Break-in face contact width is shown at 82 and could be observed after early break-in. In an implementation, full seating width 84 might be about 5 millimeters, more particularly about 4.7 millimeters. Break-in face contact width 82 in the embodiment of FIG. 4 may be about 4 millimeters, more particularly about 4.2 millimeters. An end face width of first axial end surface 48 is shown at 86 in FIG. 5 and may be about 1 millimeter. A linear segment width of outer linear segment 60 is shown at 88 and may be about 0.5 millimeters.

Figure 7:
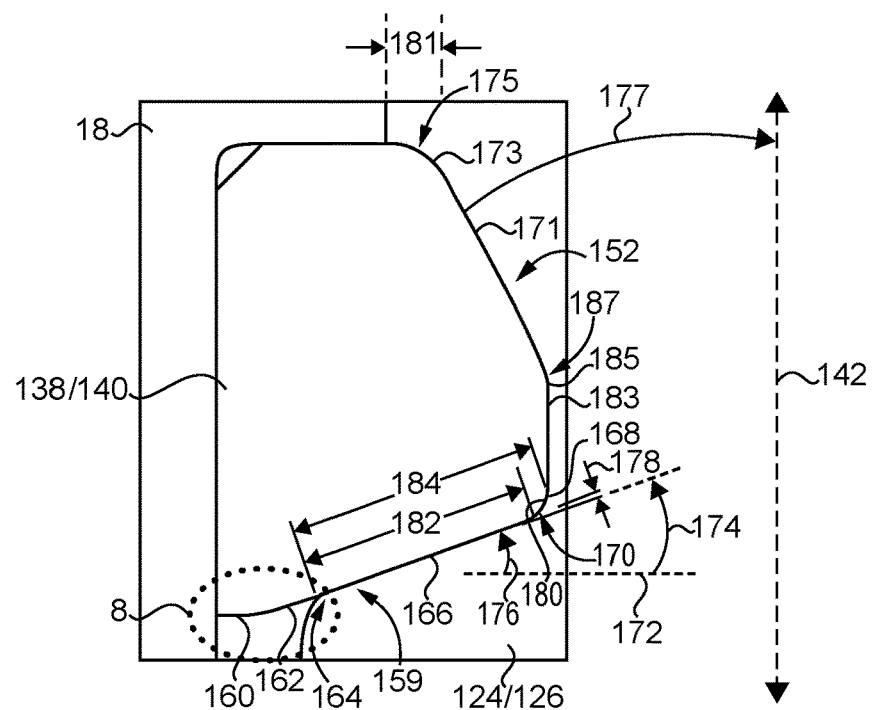
FIG. 7 is a sectioned side diagrammatic view of portions of a gas exchange valve and a valve seat insert in an engine head, according to another embodiment.
Figure 8:
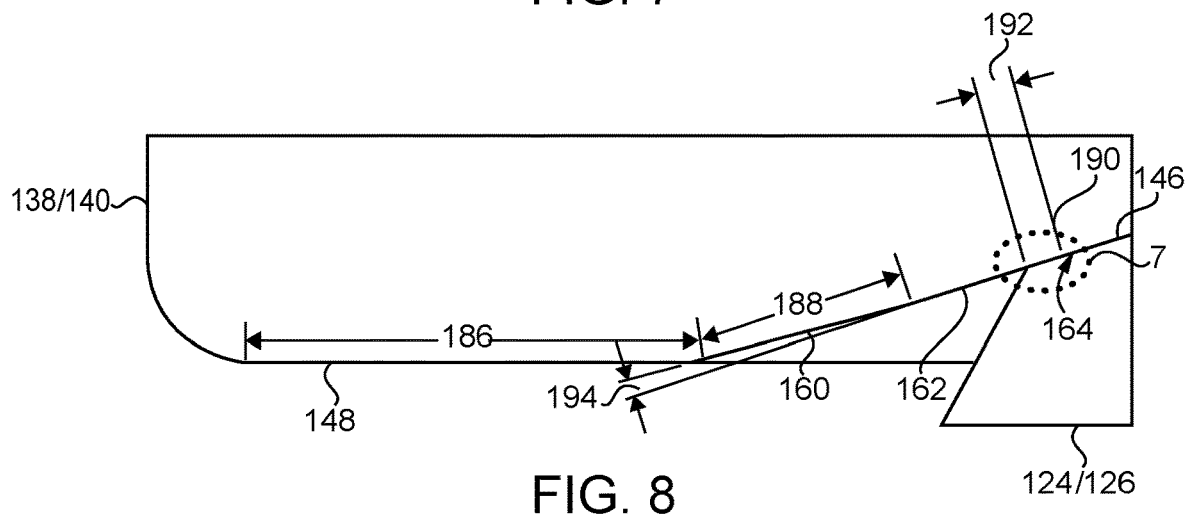
FIG. 8 is a detail view taken at circle 8 of FIG. 7.
Figure 9:
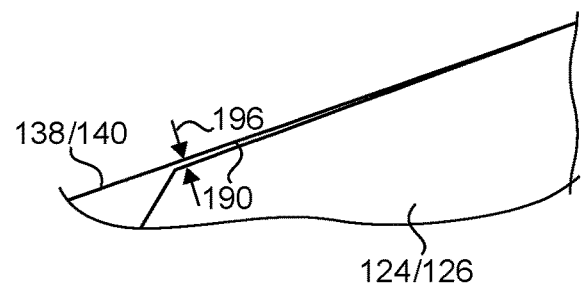
FIG. 9 is a detail view taken at circle 9 of FIG. 8.

Turning now to FIG. 7, there are shown features of a valve seat insert 138 and an annular insert body 140 in contact with a gas exchange valve 124, which can include an intake valve, according to another embodiment. Valve seat insert 138 includes a valve seating surface 159 profiled to limit valve recession and includes, in profile, an outer linear segment 160 adjacent to a first axial end surface (not numbered), an outer curved segment 162 adjacent to and transitioning with outer linear segment 160 and forming a first wear crown 164 contacted by gas exchange valve 124 at an early wear state. Valve seating surface 159 further includes an inner linear segment 166 adjacent to and transitioning with outer curved segment 162, and an inner curved segment 168 adjacent to and transitioning with inner linear segment 166 and forming a second wear crown 170 radially inward and axially inward of first wear crown 164 and contacted by gas exchange valve 124 at a later wear state. An inner valve face 146 is oriented at a valve angle 174 relative to a plane 172 normal to a valve seat center axis 142. Inner linear segment 166 is oriented at a seat angle 176 relative to plane 172 that is larger than valve angle 174 such that an interference angle 178 is formed. A clearance 180 is formed between gas exchange valve 124 and inner linear segment 166. Valve angle 174 may be about 44.4°. Seat angle 176 may be from about 20° to about 30° and may be about 20°. An interference angle 178 may be about 0.4°, and more particularly about 0.37°. A second clearance 190, as shown in FIG. 8 and FIG. 9, extends radially outward and axially outward from a contact band between inner valve face 146 and first crown 164. In valve seat insert 138, which can include an intake valve seat insert, a full seating width dimension 184 may be about 5 millimeters, more particularly about 5.4 millimeters. A break-in face contact width 182 may be about 5 millimeters, more particularly about 5.0 millimeters. A linear segment width 188 may be about 0.6 millimeters, and an end face width 186 may be about 1 millimeter. A clearance facing length 192 may be about 0.25 millimeters, an edge clearance 196 may be about 0.00043 millimeters. An angle 194 between outer linear segment 160 and inner linear segment 166 may be about 5°.

Valve seat insert 138 also includes an inner peripheral surface 152 having a lower linear segment 183 extending between and transitioning with each of second wear crown 170 and a second flow crown 187 formed by a lower curved segment 185, and a sloping segment 171 extending between and transitioning with each of lower curved segment 185 and an upper curved segment 173 forming an incoming flow crown 175. Incoming flow crown 175 is set off a set off distance 181 from engine head 18 that is greater than a size of a radius forming upper curved segment 173 and thus incoming flow crown 175. Inner peripheral surface 152 also includes a vertical segment 183 oriented parallel to valve seat center axis 142 and transitioning with each of lower curved segment 185 and upper curved segment 173. A throat (not numbered) is defined by vertical segment 183. In an implementation, a running length of vertical segment 183 is about 1.5 millimeters but may be from about 0.0 millimeters to about 2.5 millimeters. A size of the radius forming upper curved segment 173 may be about 1 millimeter. A size of the radius forming second wear crown 70 may be about 0.4 millimeters. A break-in face contact width 182 may be about 5 millimeters, and more particularly about 5.04 millimeters. A full face contact width 184 may be about 5.4 millimeters, and more particularly about 5.4 millimeters. A venturi angle may be about 10° or greater, and more particularly about 27°.

As suggested above, various features and proportions of the different valve seat insert embodiments may be within common dimensional or proportional ranges, with the illustrated embodiments representing different practical implementation strategies. Following are general dimensional and angular ranges discovered to provide suitable core design principles. A size of outer curved segment 62, 162 forming first wear crown 64, 164 may be larger than a size of inner curved segment 68, 168 forming second wear crown 70, 170. Outer curved segment 62, 162 may be formed by a radius having a size from about 3 millimeters to about 6 millimeters. Inner curved segment 68, 168 may be formed by a radius having a size from about 0.4 millimeters to about 3 millimeters. The radius forming inner curved segment 80, 180 and thus second wear crown 70, 170 may be smaller than each of the radius forming outer curved segment 62, 162 and thus first wear crown 64, 164 and the radius forming inner curved segment 68, 168 and thus second wear crown 70, 170. The radius forming upper curved segment 73, 173 may be larger than the radius forming inner curved segment 68, 168. Full face contact width 84, 184 may be from about 4 millimeters to about 5 millimeters, more particularly from about 4.67 millimeters to about 5.42 millimeters. Break-in face contact width 82, 182 may be from about 4 millimeters to about 5 millimeters, more particularly from about 4.16 millimeters to about 5.04 millimeters. Interference angle 78, 178 may be from about 0.3° to about 0.6°, and more particularly about 0.37°. Facing length 88, 188 may be from about 0.52 millimeters to about 0.63 millimeters. Angle 94, 194 may be from about 5° to about 10°. Venturi angle 77, 177 may be from about 10° to about 30°, more particularly from about 14° to about 27°. A running length of inner linear segment 66, 166 can vary consistent with the full face width range and other valve seating surface parameters discussed herein. The radius forming upper curved segment 75, 175 and thus first flow crown 75, 175 may be from about 1 millimeter to about 3 millimeters. Lower curved segment 183 and thus second flow crown 185 may be formed by a radius that is from about 5 millimeters to about 7 millimeters and particularly about 5.4 millimeters. The radius forming second flow crown 185 may be larger than each of the radius forming outer curved segment 62 and thus first wear crown 164 and the radius forming upper curved segment 173 and thus incoming flow crown 175.

INDUSTRIAL APPLICABILITY

Figure 10:
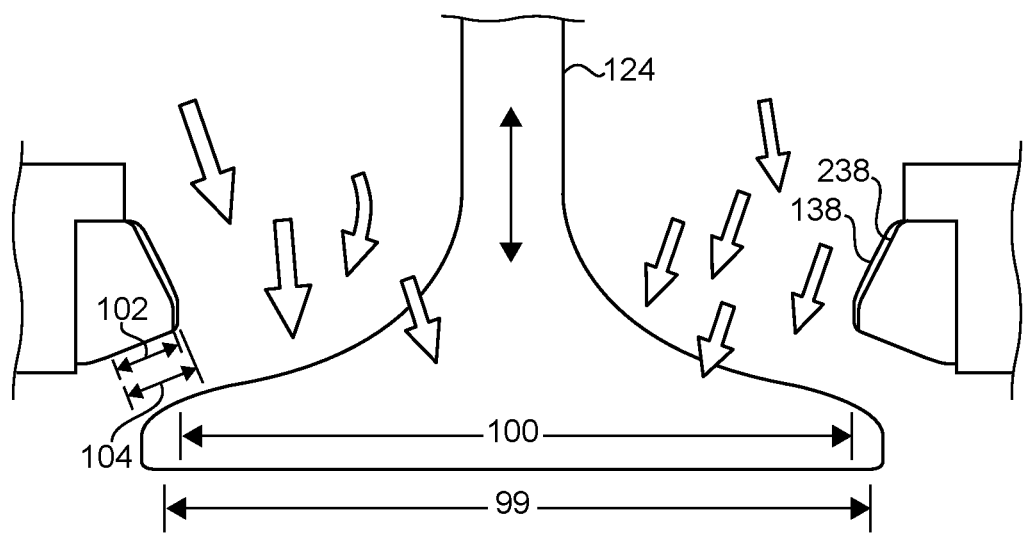
FIG. 10 is a comparative illustration of a valve seat insert in an engine head in proximity to an intake valve, according to the present disclosure, in comparison with another design.

Referring now to FIG. 10, there is shown a comparative diagram where valve seat insert 138 of the present disclosure and another valve seat insert 238 structured differently from embodiments of the present disclosure but with certain similar design features are shown in profile. Valve seat insert 138 has full face contact seating width 184 (after break-in) that is increased relative to an analogous seating width 102 of valve seat insert 238 by about 25%. Although not show in FIG. 10, the full face contact seating width 84 of valve seat insert 38 (after break-in) may be increased relative to seating width 102 by about 10%. A throat diameter 100 defined by valve seat insert 138 is greater than a throat diameter 99 defined by valve seat insert 238, meaning that valve seat insert 238 has a larger available flow area for intake gases. It can be noted that valve seat insert 238 is not structured with flow crowns or wear crowns according to the present disclosure.

Valve seat inserts can play a key role in engine performance and durability by way of wear performance for engine head life. Optimizing air flow at the same time as reducing wear has proven to be a great challenge. During operating an engine, intake valves reciprocate into and out of contact with a valve seat insert. Gases including air or air mixed with other gases such as recirculated exhaust gas or gaseous fuel, is typically supplied at a pressure greater than atmospheric pressure to the engine, such as from a turbocharger compressor. Downward travel of a piston in conjunction with the pressurization of the intake gases, causes the intake gases to rush into the cylinder as the piston moves from a top dead center position toward a bottom dead center position in an intake stroke so long as the intake valve is open.

According to the present disclosure, intake gases encountering incoming flow crown 75, 175 will tend to flow relatively smoothly past incoming flow crown 75, 175 and enter the venturi formed by inner peripheral surface 52, 152. Upon entering the venturi, the incoming gases will begin to accelerate according to known principles toward the associated cylinder. The accelerated intake gases can then be expected to flow smoothly around second flow crown 187, in the case of valve seat insert 138, and in the case of either of the valve seat inserts of the present disclosure, around second wear crown 70, 170, past valve seating surface 59, 159 and eventually around and past gas exchange valve 24, 124 and into the associated cylinder for combustion with fuel therein. The smooth and accelerating flow through the valve seat inserts of the present disclosure can compensate for, or more than compensate for, the reduced flow area as compared to the design of valve seat insert 238 and other designs with sacrificing valve seat or valve performance or engine service life.

Figure 11:
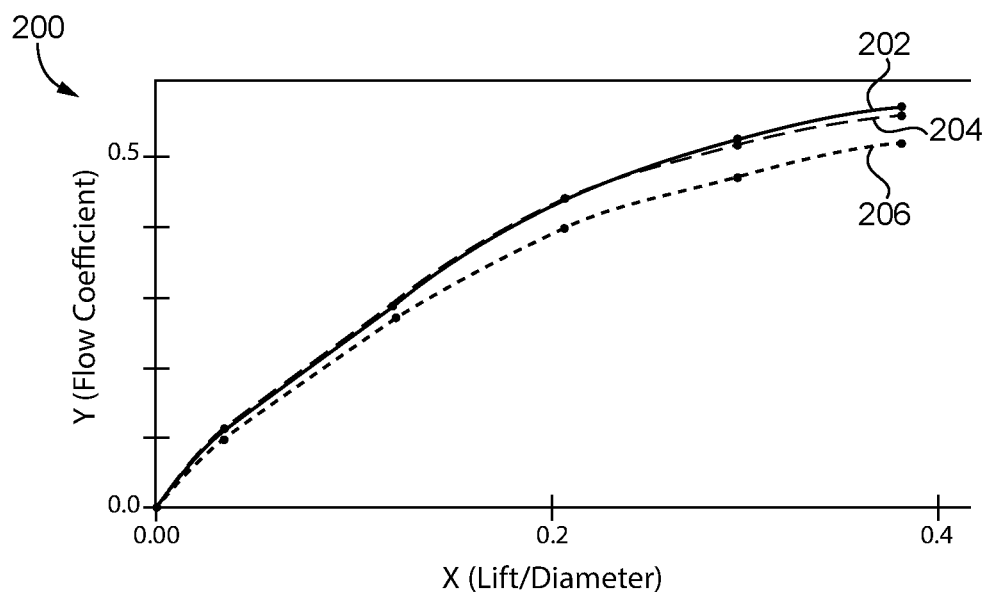
FIG. 11 is a graph of flow coefficient in comparison to valve lift/diameter for designs according to the present disclosure and another design.

Referring also now to FIG. 11, there is shown a graph 200 where a flow coefficient is shown on the Y-axis in comparison to valve lift/diameter on the X-axis. Flow coefficient is a dimensionless quantity based on a quotient of actual flow over idealized flow. Valve lift/diameter can be understood as the quotient of a distance an intake valve is lifted and a valve seat insert throat diameter. A curve 202 shows an approximate result that might be expected for valve seat insert 138, a curve 204 shows an approximate result that might be expected for valve seat insert 38, and a curve 206 shows an approximate result that might be expected for valve seat insert 238. It will be appreciated that curves 202 and 204 evidence a flow coefficient that is at least as great, and generally greater, than a flow coefficient observed for valve seat insert 238. This improved performance is observed even where an available flow area for intake gases is reduced in comparison to other designs, such as in the case of valve seat insert 238.

It will also be recalled that valve seating diameter 102 associated with valve seat insert 238 is less than full face contact widths 84, 184 associated with valve seat inserts 38 and 138, and that valve seat insert 238 is not formed with wear crowns or certain other specialized valve seating geometry. The wear crowns discussed herein, in conjunction with the valve seating contact widths, seat angles, valve angles, and other geometric features, are designed in a manner that can be understood as cushioning valve-valve seat impacts to reduce valve seat beat-in as well as slowing certain wear modes. Providing a valve seat geometry in line with such goals can improve over valve seat designs such as that used in valve seat insert 238 but has been discovered to place certain limitations on the design of other valve seat insert characteristics such as gas flow properties.

Along such lines, the geometry of valve seat insert 38, 138 with respect to intake valve seating properties, and the geometry of valve seat insert 38, 138 with respect to intake gas flow properties can be understood as a system of cross-coupled variables where modifying one aspect of valve seat insert geometry can affect another aspect of valve seat insert geometry, often in unpredictable ways. For instance, providing second wear crown 70, 170 tends to require throat diameter to be reduced if valve seating diameter is to be maintained or increased. In the case of second wear crown 70, 170, too large a radius could impact flow area, venturi angle, seat angle, or other parameters. Too small a radius could fail to provide desired flow patterns and/or compromise desired valve seating performance. Incorporating incoming flow crown 75, 175 and positioning incoming flow crown 75, 175 so as to be set off from the engine head can further reduce available flow area over what might be obtained with a valve seat insert having no incoming flow crown and no set off from the engine head. If the radius forming an incoming flow crown is too small, for instance, the beneficial effects on incoming flow of intake gases might not be realized. If the radius forming an incoming flow crown is too large, then the venturi angle might be too narrow to achieve a desired acceleration of flow. Additional factors such as determining a suitable venturi angle range, a seat angle range, whether a second flow crown is used, and still others can have similar effect. Where more than one design parameter is varied from design to design, the effects on performance can be still more complex and unpredictable. For these general reasons, it will be appreciated that the optimized designs and parametric guidelines of the present disclosure offer a practical balancing of factors bearing on valve seating and intake gas flow performance.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have." "having." or the like are intended to be open-ended terms. Further, the phrase "based on" is intended to mean "based, at least in part, on" unless explicitly stated otherwise.

What is claimed is:

1. An engine head assembly for an internal combustion engine comprising:
an engine head having an intake conduit formed therein;
a valve seat insert positioned at least partially within the engine head and defining a valve seat center axis extending between a first axial end surface structured to face a cylinder in the internal combustion engine, and a second axial end surface;
the valve seat insert further having an inner peripheral surface forming a throat, an outer peripheral surface, and a valve seating surface;
the valve seating surface including, in profile, an outer curved segment forming a first wear crown for contacting an intake valve at an early wear state, an inner curved segment forming a second wear crown for contacting the intake valve at a later wear state, and a linear segment extending between the outer curved segment and the inner curved segment;
the inner peripheral surface including, in profile, an upper curved segment forming an incoming flow crown, and a sloping segment disposed between the upper curved segment and the inner curved segment; and
the upper curved segment transitioning with the second axial end surface and the incoming flow crown being set off radially inward from the engine head, and the sloping segment being oriented at a venturi angle relative to the valve seat center axis, such that the inner peripheral surface forms a venturi to accelerate an incoming flow of gases to the cylinder.

2. The engine head assembly of claim 1 wherein the venturi angle is from about 10° to about 30°.

3. The engine head assembly of claim 2 wherein the linear segment of the valve seating surface defines a break-in face contact width that is from about 4 millimeters to about 5 millimeters, and the sloping segment has a running length that is greater than the break-in face contact width.

4. The engine head assembly of claim 3 wherein the incoming flow crown is set off radially inward from the engine head a distance that is greater than a size of a radius forming the upper curved segment.

5. The engine head assembly of claim 3 wherein the size of the radius forming the upper curved segment is from about 1 millimeter to about 3 millimeters, a size of a radius forming the outer curved segment is from about 3 millimeters to about 6 millimeters, and a size of a radius forming the inner curved segment is from about 0.4 millimeters to about 3 millimeters.

6. The engine head assembly of claim 3 wherein the sloping segment transitions with each of the upper curved segment and the inner curved segment, and the throat is defined by the inner curved segment.

7. The engine head assembly of claim 3 wherein the inner peripheral surface further includes, in profile, a lower curved segment forming a second flow crown.

8. The engine head assembly of claim 7 wherein the inner peripheral surface further includes, in profile, a vertical segment oriented parallel to the valve seat center axis and transitioning with each of the lower curved segment and the inner curved segment, and the throat is defined by the vertical segment.

9. A valve seat insert for an intake valve in an internal combustion engine having a cylinder, the valve seat insert comprising:
an annular insert body defining a valve seat center axis extending between a first axial end surface structured for facing the cylinder in the internal combustion engine, and a second axial end surface;
the annular insert body further having an inner peripheral surface defining a throat structured to fluidly connect the cylinder to an intake conduit in an engine head, an outer peripheral surface, and a valve seating surface for contacting the intake valve extending between the first axial end surface and the inner peripheral surface;
the valve seating surface including, in profile, an outer curved segment forming a first wear crown for contacting the intake valve at an early wear state, an inner curved segment forming a second wear crown for contacting the intake valve at a later wear state, and a linear segment extending between the outer curved segment and the inner curved segment;
the inner peripheral surface including, in profile, an upper curved segment forming an incoming flow crown, and a sloping segment extending between the upper curved segment and the inner curved segment; and
the upper curved segment transitioning with the second axial end surface, and the sloping segment extending radially inward from the upper curved segment at a venturi angle, of about 10° or greater, relative to the valve seat center axis, such that the inner peripheral surface forms a venturi to accelerate an incoming flow of gases to the cylinder.

10. The valve seat insert of claim 9 wherein the upper curved segment is formed by a radius larger than a radius forming the inner curved segment.

11. The valve seat insert of claim 9 wherein the venturi angle is from about 10° to about 30°.

12. The valve seat insert of claim 9 wherein:
the linear segment of the valve seating surface defines a break-in face contact width that is from about 4 millimeters to about 5 millimeters;
a size of a radius forming the upper curved segment is from about 1 millimeter to about 3 millimeters;
a size of a radius forming the outer curved segment is from about 3 millimeters to about 6 millimeters; and
a size of a radius forming the inner curved segment is from about 0.4 millimeters to about 3 millimeters.

13. The valve seat insert of claim 12 wherein the sloping segment transitions with each of the upper curved segment and the inner curved segment, and the throat is defined by the inner curved segment.

14. The valve seat insert of claim 13 wherein:
the break-in face contact width is about 4 millimeters;
the size of the radius forming the upper curved segment is about 1 millimeter;
the size of the radius forming the second wear crown is about 0.4 millimeters; and
the venturi angle is about 14°.

15. The valve seat insert of claim 12 wherein the inner peripheral surface further includes, in profile, a lower curved segment forming a second flow crown, and a vertical segment oriented parallel to the valve seat center axis and transitioning with each of the second wear crown and the second flow crown, and the throat is defined by the vertical segment.

16. The valve seat insert of claim 15 wherein a running length of the vertical segment is about 1.5 millimeters.

17. The valve seat insert of claim 15 wherein:
the break-in face contact width is about 5 millimeters;
the size of the radius forming the upper curved segment is about 1 millimeter;
the size of the radius forming the second wear crown is about 0.4 millimeters; and
the venturi angle is about 27°.

18. A valve seat insert for an intake valve in an internal combustion engine having a cylinder, the valve seat insert comprising:
an annular insert body defining a valve seat center axis extending between a first axial end surface structured for facing the cylinder in the internal combustion engine, and a second axial end surface;
the annular insert body further having an inner peripheral surface defining a throat structured to fluidly connect the cylinder to an intake conduit in an engine head, an outer peripheral surface, and a valve seating surface for contacting the intake valve extending between the first axial end surface and the inner peripheral surface;
the valve seating surface forming a first wear crown for contacting the intake valve at an early wear state, a second wear crown that is radially inward and axially inward of the first wear crown, for contacting the intake valve at a later wear state, and a middle surface that is linear in profile and extends between the first wear crown and the second wear crown;
the inner peripheral surface forming an incoming flow crown transitioning with the second axial end surface, and a venturi disposed between the incoming flow crown and the second wear crown and defining a venturi angle of about 10° or greater relative to the valve seat center axis.

19. The valve seat insert of claim 18 wherein the inner peripheral surface further includes a second flow crown between the venturi and the second wear crown, and the second flow crown being formed by a radius that is larger than each of the radius forming the first wear crown and the radius forming the incoming flow crown.

* * * * *